US012555038B2

(12) United States Patent
VanBlon et al.

(10) Patent No.: US 12,555,038 B2
(45) Date of Patent: Feb. 17, 2026

(54) DIGITAL ASSISTANT AUDIO RECEPTION CONFIRMATION USING BIOMETRIC STATE

(71) Applicant: LENOVO (SINGAPORE) PTE. LTD., Singapore (SG)

(72) Inventors: Russell Speight VanBlon, Raleigh, NC (US); Kevin W Beck, Raleigh, NC (US); Thorsten Stremlau, Morrisville, NC (US); David Schwarz, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 722 days.

(21) Appl. No.: 17/952,997

(22) Filed: Sep. 26, 2022

(65) Prior Publication Data

US 2024/0104425 A1  Mar. 28, 2024

(51) Int. Cl.
*G06N 20/00* (2019.01)
*G06N 5/02* (2023.01)
(Continued)

(52) U.S. Cl.
CPC .............. *G06N 20/00* (2019.01); *G06N 5/02* (2013.01); *G06N 5/04* (2013.01); *G10L 15/22* (2013.01);
(Continued)

(58) Field of Classification Search
CPC . G06N 20/00; G06N 5/02; G06N 5/04; G10L 15/22; G10L 2015/223; G08B 21/182
See application file for complete search history.

(56) References Cited

U.S. PATENT DOCUMENTS

| 2015/0237598 A1* | 8/2015 | Yoshitomi | H04W 4/12 455/412.2 |
| 2017/0289954 A1* | 10/2017 | Mese | H04W 4/80 |
| 2019/0068663 A1* | 2/2019 | Anders | H04N 7/155 |

FOREIGN PATENT DOCUMENTS

KR  101998881 B1 *  7/2019  ............. G08B 27/00

OTHER PUBLICATIONS

Putman et al., "EEG theta/beta ratio as a potential biomarker for attentional control and resilience against deleterious effects of stress on attention," Cogn Affect Behav Neurosci, Jun. 2014, 14(2), pp. 782-791. doi: 10.3758/s13415-013-0238-7, PMID: 24379166.
(Continued)

*Primary Examiner* — Eric Nilsson
(74) *Attorney, Agent, or Firm* — Osha Bergman Watanabe & Burton LLP

(57) ABSTRACT

An approach is disclosed that receives, at a computer system, a set of biometric data readings pertaining to a user of the system. The biometric data readings are received from biometric sensors that are near the user. After receiving the biometric readings, an audible notification is transmitted to the user. Subsequently, a second set of biometric data readings pertaining to the user from the biometric sensors that are proximate to the user. The first and second sets of biometric data readings are compared with the comparison resulting in a confidence level that the user heard the transmitted audible notification. The audible notification is retransmitted in response to the confidence level being below a threshold not retransmitted in response to the confidence level meeting the threshold indicating that the user heard the first transmission.

14 Claims, 6 Drawing Sheets

(51) Int. Cl.
*G06N 5/04* (2023.01)
*G08B 21/18* (2006.01)
*G10L 15/22* (2006.01)

(52) U.S. Cl.
CPC ...... *G08B 21/182* (2013.01); *G10L 2015/223* (2013.01)

(56) References Cited

OTHER PUBLICATIONS

Luque-Casado et al., "Cognitive Performance and Heart Rate Variability: The Influence of Fitness Level," PloS One, vol. 8, Feb. 2, 2013: e56935. doi:10.1371/journal.pone.0056935, 9 pages.

* cited by examiner

DIGITAL ASSISTANT AUDIO RECEPTION CONFIRMATION USING BIOMETRIC STATE

BACKGROUND

Digital assistants are computer-based software agents that can perform tasks or services for an individual based on commands or questions provided by the user. These commands and questions are often provided verbally by the user with the digital assistant often providing audible responses, such as with synthesized voice output. Using such a digital assistant, a user can ask the assistant questions, control automated devices, request media playback, and manage such tasks as email, online calendars, and list management (e.g., shopping lists, to-do lists, etc.). Because of the back-and-forth nature of digital assistant communications, traditional digital assistants signify acknowledgement of user question and commands, typically in an auditory fashion.

SUMMARY

An approach is disclosed that receives, at a computer system, a set of biometric data readings pertaining to a user of the system. The biometric data readings are received from biometric sensors that are near the user. After receiving the biometric readings, an audible notification is transmitted to the user. Subsequently, a second set of biometric data readings pertaining to the user from the biometric sensors that are proximate to the user. The first and second sets of biometric data readings are compared with the comparison resulting in a confidence level that the user heard the transmitted audible notification. The audible notification is retransmitted in response to the confidence level being below a threshold not retransmitted in response to the confidence level meeting the threshold indicating that the user heard the first transmission The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

FIGS. 1-6 describe an approach that provides components and logic to allow a digital assistant to determine whether a user heard a notification audibly transmitted by the digital assistant based on the user's biometric response. The approach leverages the user's biometric state to confirm reception of an audio message (notification). The approach allows the personal assistant to key off of the user's general biometric state, such as from the user wearing wearable devices, cameras capturing the user's biometric response, and the like. The approach leverages the biometric response shown when the user's brain responds to information that the user hears showing that the user's attention shifted, even subtlety, to a prompt (the notification) provided by the digital assistant.

When the digital assistant receives the user's biometric state information both before the assistant audibly transmitted the notification and right after the transmission was transmitted, the digital assistant can ascertain whether the user's attention shifted in a way indicating that the user heard the notification or that the user's attention was fixated on something else or was wandering or otherwise not paying any attention. In one embodiment, an electroencephalogram (EEG) sensor is used to measure a change in the level of beta and theta waves in the user's brain. The approach also utilizes historical data to train an artificial intelligence system that, once trained, provides a confidence level given the user's biometric data that the user heard a notification transmitted by the digital assistant.

In the approach, if the user's biometric data indicate no change in attention, the system has a low confidence level that the user heard the assistant's notification and the volume of the system can be raised and the notification can be retransmitted. On the other hand, if the user's biometric data indicates a shift in attention commensurate with the timing of the digital assistant's notification, then a higher confidence level is indicated that the user heard the notification and further retransmission of the notification can be inhibited.

In one embodiment, while using the system, the model utilized by the artificial intelligence system is continually trained based on the biometric data received at the digital assistant when the assistant is providing audible notifications to the user. The approach helps prevent the user from having to verbally acknowledge audible notifications provided by the assistant and further makes it less likely that the digital assistant's audible notifications disturb the users or others in proximity to the speakers used to transmit notifications. In one embodiment, the approach factors in conditions such as background noise and current activities, including the current activity of the user, to determine a certain volume level of audible notifications appropriate to the user's current surroundings.

Figure 1:
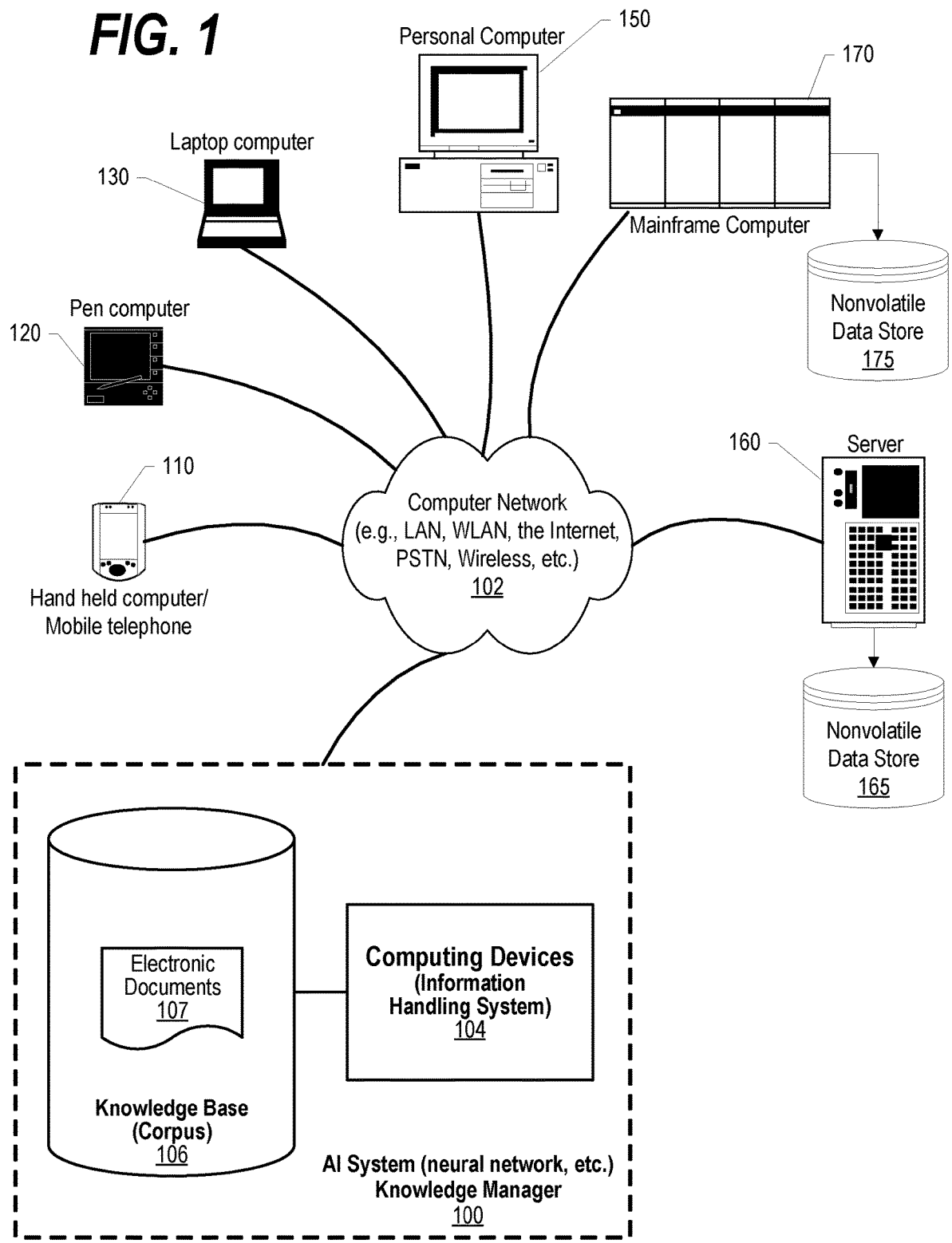
FIG. 1 depicts a network environment that includes a knowledge manager that utilizes a knowledge base.

FIG. 1 depicts a schematic diagram of one illustrative embodiment of knowledge manager (KM) system 100 in a computer network 102. KM system 100 includes a knowledge manager computing device 104 (comprising one or more processors and one or more memories, and potentially any other computing device elements generally known in the art including buses, storage devices, communication interfaces, and the like) that connects KM system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. KM system 100 and network 102 may enable functionality, such as question/answer (QA) generation functionality, for one or more content users. Other embodiments of KM system 100 may be used with components, systems, sub-systems, and/or devices other than those that are depicted herein.

KM system 100 maintains knowledge base 106, also known as a "corpus," which is a store of information or data that the KM system draws on to solve problems. This knowledge base includes underlying sets of facts, assumptions, models, and rules which the KM system has available in order to solve problems.

KM system 100 may be configured to receive inputs from various sources.

For example, KM system 100 may receive input from the network 102, a corpus of electronic documents 107 or other data, a content creator, content users, and other possible sources of input. In one embodiment, some or all of the inputs to KM system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with KM system 100. Electronic documents 107 may include any file, text, article, or source of data for use in KM system 100. Content users may access KM system 100 via a network connection or an Internet connection to the network 102, and, in one embodiment, may input questions to KM system 100 that may be answered by the content in the corpus of data. As further described below, when a process evaluates a given section of a document for semantic content, the process can use a variety of conventions to query it from the knowledge manager.

In a question/answering (QA) embodiment of a KM system, one convention is to send a well-formed question to the QA system. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. KM system 100 may interpret the question and provide a response to the content user containing one or more answers to the question. In some embodiments, KM system 100 may provide a response to users in a ranked list of answers.

In some illustrative embodiments, KM system 100 may be the IBM Watson™ question/answering (QA) system available from International Business Machines Corporation of Armonk, New York, which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data.

Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize KM system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
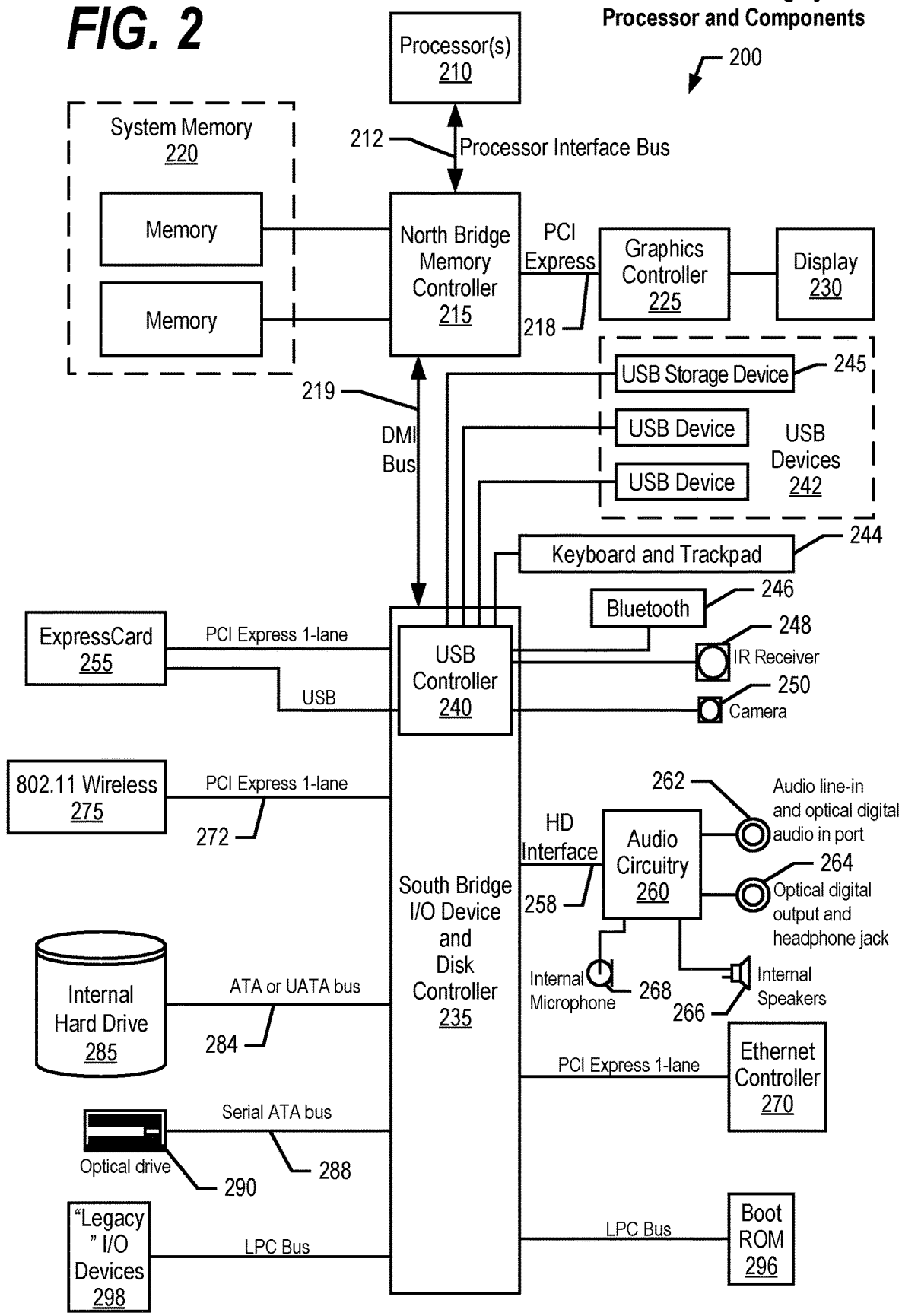
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
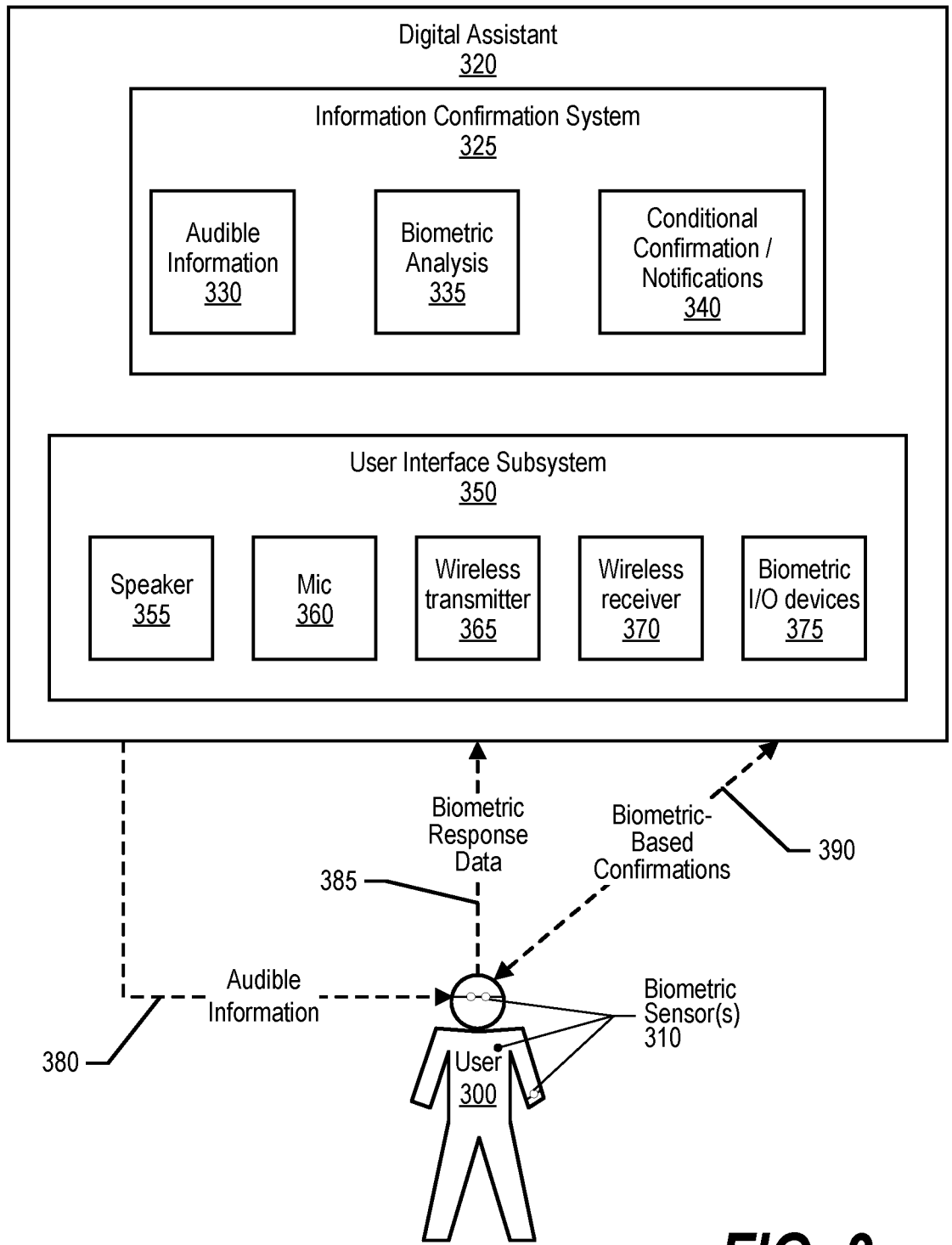
FIG. 3 is a diagram that depicts components used in providing digital assistant audio reception confirmation using biometric information.

FIG. 3 is a diagram that depicts components used in providing digital assistant audio reception confirmation using biometric information. User 300 utilizes digital assistant 320 to perform a variety of tasks and functions such as asking the assistant questions, controlling automated devices, requesting media playback, and managing tasks such as email, online calendars, and list management (e.g., shopping lists, to-do lists, etc.). Digital assistant 320 includes information confirmation system 320 that performs various functions regarding communication with the user. These functions include providing audible information to the user (330), biometric analysis of biometric data received from the user (335), and conditional confirmation and notifications (340) to confirm notifications (using biometric data as well as verbal confirmations) the audible information sent to the user from the digital assistant.

User interface subsystem 350 is a set of devices and related software (firmware, device drivers, application software, etc.) that digital assistant 320 uses to communicate with user 300. This subsystem includes a number of component devices such as speaker 355, digital microphone 360, wireless transmitter 365, wireless receiver 370, and biometric input/output devices 375. Speaker 355 is used to provide audible information 330 to user 300 so that the user can hear the audible information, such as a notification. Digital microphone 360 captures verbal input, such as instructions, acknowledgements, and the like, spoken by user 300 and directed to digital assistant 320.

Wireless transmitter 365 allows digital assistant 320 wireless communication with user devices, such as a wearable biometric sensor 310 (e.g., EEG sensor, smart watch with pulse sensor, etc.) in order to send such devices instructions or requests, such as a request for the user's current biometric data. Wireless receiver 370 works in conjunction with wireless transmitter 365 in that the wireless receiver receives, at the digital assistant, digital biometric data sent from biometric sensor devices proximate to the user, such as receiving the user's current EEGs or pulse from a wearable device currently being worn by the user.

Biometric I/O devices 375 include further biometric sensing devices are not wearable devices. An example of such biometric I/O devices would be a digital camera used to capture the user's digital images just before the digital assistant provides audible information and just after the digital assistant provides the audible information. Using a trained artificial intelligence (AI) system, the digital assistant can compare the biometric response data 385 (e.g., EEGs, pulse, digital image, etc.) of the user before audible information 380 is transmitted to the user with biometric response data of the user just after the audible information is provided. This comparison is used to determine a confidence level that the user heard the audible information that was provided by the digital assistant. Biometric-based confirmations 390 is the non-verbal biometric confirmation from the user's biometric response data that indicates that the user heard audible information 380.

Figure 4:
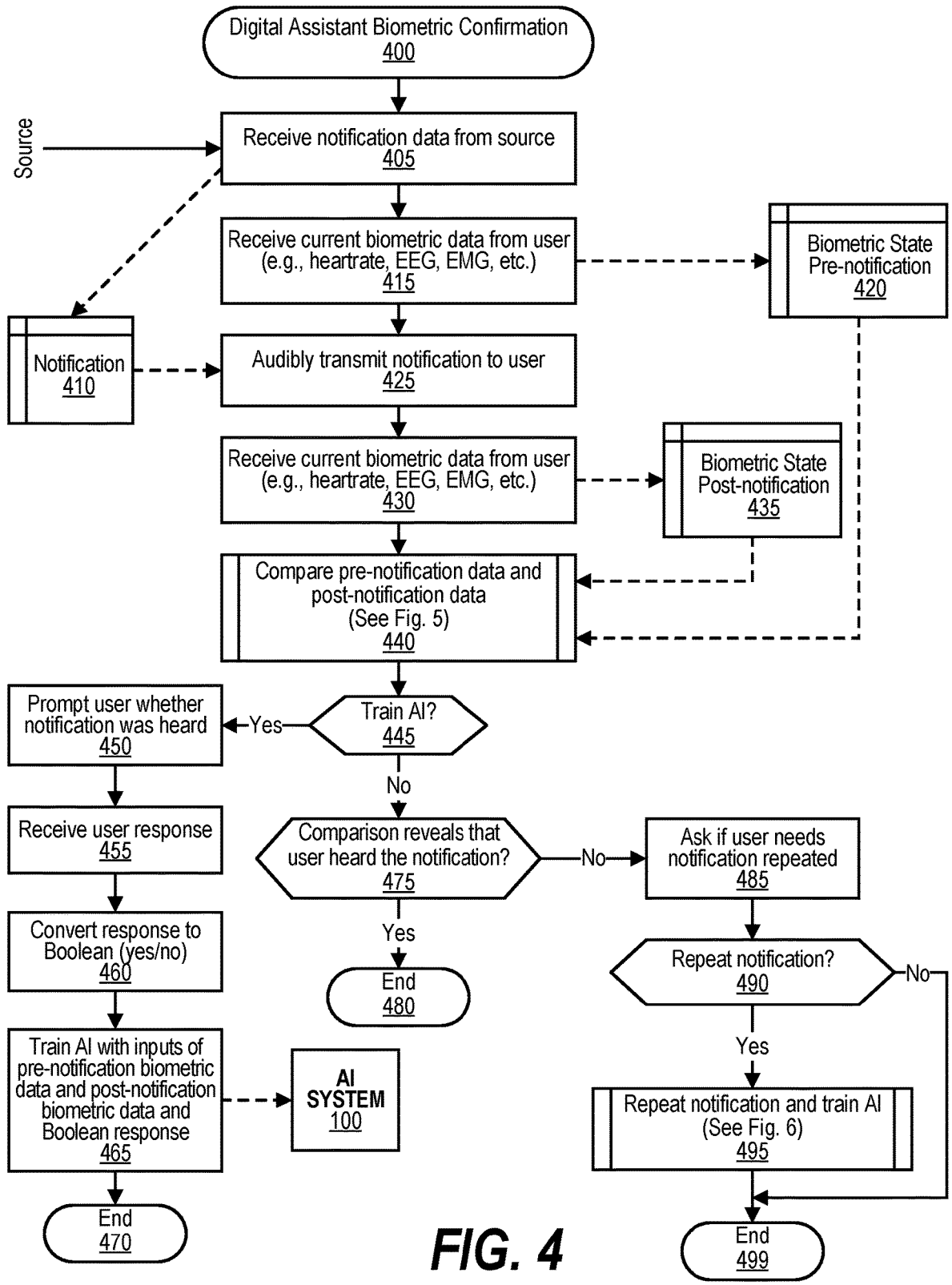
FIG. 4 is a depiction of a flowchart showing the logic used to provide digital assistant biometric confirmation.

FIG. 4 is a depiction of a flowchart showing the logic used to provide digital assistant biometric confirmation. FIG. 4 processing commences at 400 and shows the steps taken by a biometric confirmation process performed by a digital assistant. At step 405, the digital assistant receives notification data from source. For example, the digital assistant might receive a severe weather warning from a source, such as the National Weather Service. This notification data is stored in memory area 410.

At step 415, the process receives the user's current biometric data (e.g., heartrate, EEG, EMG, digital image, pulse, etc.). This data is stored in memory area 420. At step 425, the process audibly transmits the notification from memory area 410 to the user over the system's speakers. At step 430, the process receives the user's current biometric data shortly after the digital assistant has audibly played the notification data. This biometric data is stored in memory area 435.

Figure 5:
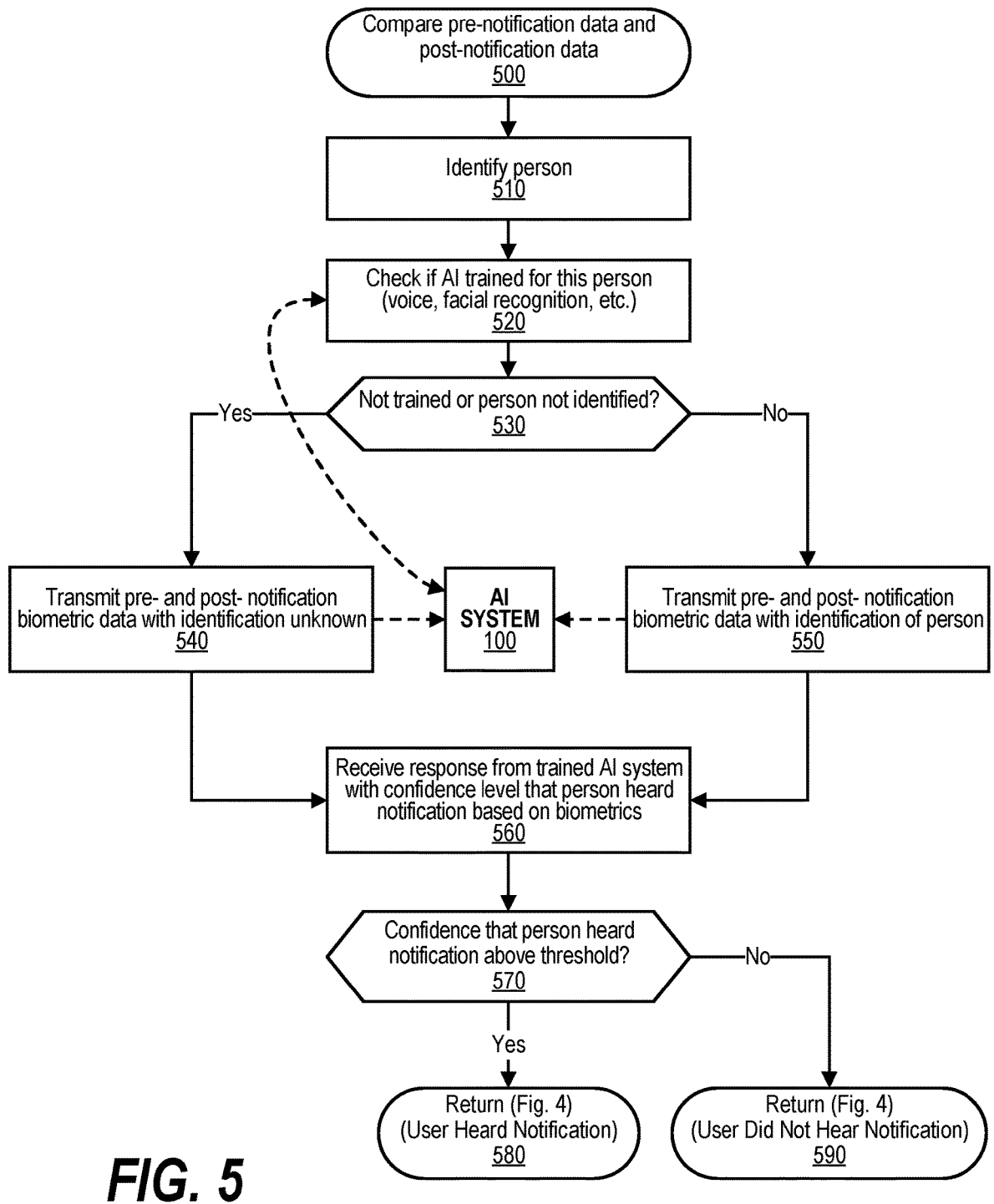
FIG. 5 is a depiction of a flowchart showing the logic used to compare a user's pre-notification biometric data to their post-notification biometric information to determine if the user heard a notification from the digital assistant.

At predefined process 440, the process performs the Compare Pre-notification Biometric Data and Post-Notification Biometric Data routine (see FIG. 5 and corresponding text for processing details). In one embodiment, this routine uses a trained artificial intelligence that computes a confidence level that the user heard the notification based on the user's pre- and post-notification sets of biometric data.

The process determines whether the AI system is currently being trained (decision 445). If the AI system is currently being trained, then decision 445 branches to the 'yes' branch to perform steps 450 through 470. On the other hand, if the AI system is not currently being trained, then decision 445 branches to the 'no' branch to perform steps 475 through 499.

Steps 450 through 470 are performed when the AI system is being trained. At step 450, the process prompts the user and asks the user whether the notification was heard by the user. At step 455, the process receives the user's response. At step 460, the process converts the user's response to a Boolean response (e.g., yes/no, I/O, true/false, etc.). At step 465, the process trains AI system 100 with inputs of the pre-notification biometric data and the post-notification biometric data along with the user's Boolean response. Training of the AI system is further shown in FIG. 6 utilizing a set of training data. Once training of the AI system is complete, processing ends at 470.

The process determines whether the comparison at predefined process 440 reveals that the user heard the notification (decision 475). If the comparison performed by the trained AI of the pre- and post-notification biometric state data reveals that the user heard the notification, then decision 475 branches to the 'yes' branch whereupon processing ends at 480 thereby inhibiting retransmission of the audible notification. On the other hand, if the comparison performed by the trained AI of the pre- and post-notification biometric state data reveals that the user likely did not heard the notification, then decision 475 branches to the 'no' branch to perform steps 485 through 499.

Steps 475 through 499 are performed when the AI system is not being trained. In one embodiment, decision 475 is based on a confidence level, or value, returned by the AI system at predefined process 440 that the user heard the notification and further comparison of the confidence level to a threshold. If the confidence level is above the threshold, then the decision branches to the 'yes' branch confident that the user heard the notification. On the other hand, if the confidence level is below the threshold, then the decision branches to the 'no' branch as the system is not confident that the user heard the notification.

At step 485, the process audibly asks the user whether the user needs the notification repeated by the digital assistant. Based on the user's response (e.g., "yes" or "no", etc.), the process determines whether to repeat the notification (decision 490). If the notification is repeated, then decision 490 branches to the 'yes' branch whereupon, at predefined process 495, the notification is repeated and the AI system is further trained (see FIG. 6 and corresponding text for details). On the other hand, if the notification is not being repeated, then decision 490 branches to the 'no' branch. In one embodiment, if the notification is not being repeated, the AI system can still be further trained with the pre- and post-notification biometric data readings and an indication that the user heard the notification corresponding to such readings. Processing thereafter ends at 499.

FIG. 5 is a depiction of a flowchart showing the logic used to compare a user's pre-notification biometric data to their post-notification biometric information to determine if the user heard a notification from the digital assistant. FIG. 5 processing commences at 500 and shows the steps taken by a process that compares pre- and post-notification biometric data from a user using an artificial intelligence (AI) system that provides a confidence level as to whether the user heard the notification.

At step 510, the process identifies the person using the digital assistant. In one embodiment, multiple users can use the digital assistant so the system trains the AI system for each of the identified users as each user might have different biometric responses to notification data provided by the digital assistant. At step 520, the process checks whether the AI is already trained for this person (voice, facial recognition, EEGs, etc.).

The process determines whether the AI has been or if the person is not identified (decision 530). If the AI is not trained for this person or if the person is not identified, then decision 530 branches to the 'yes' branch whereupon, at step 540, the process transmits pre- and post-notification biometric data with identification unknown to AI system 100. On the other hand, if the AI is trained for this identified person, then decision 530 branches to the 'no' branch whereupon, at step 550, the process transmits pre- and post-notification biometric data with the identification of the user to AI system 100.

At step 560, the process receives a response from the trained AI system with a confidence level that the person actually heard the notification based on pre- and post-notification biometric data provided to the AI system. The process determines whether the confidence level that the person actually heard the notification is above a threshold (decision 570).

If the confidence level that the person actually heard the notification is above a threshold, then decision 570 branches to the 'yes' branch whereupon processing returns to the calling routine (see FIG. 4) with an indication that the user heard the notification. On the other hand, if the confidence level that the person actually heard the notification is below the threshold, then decision 570 branches to the 'no' branch whereupon processing returns to the calling routine (see FIG. 4) with an indication that the user did not hear the notification.

Figure 6:
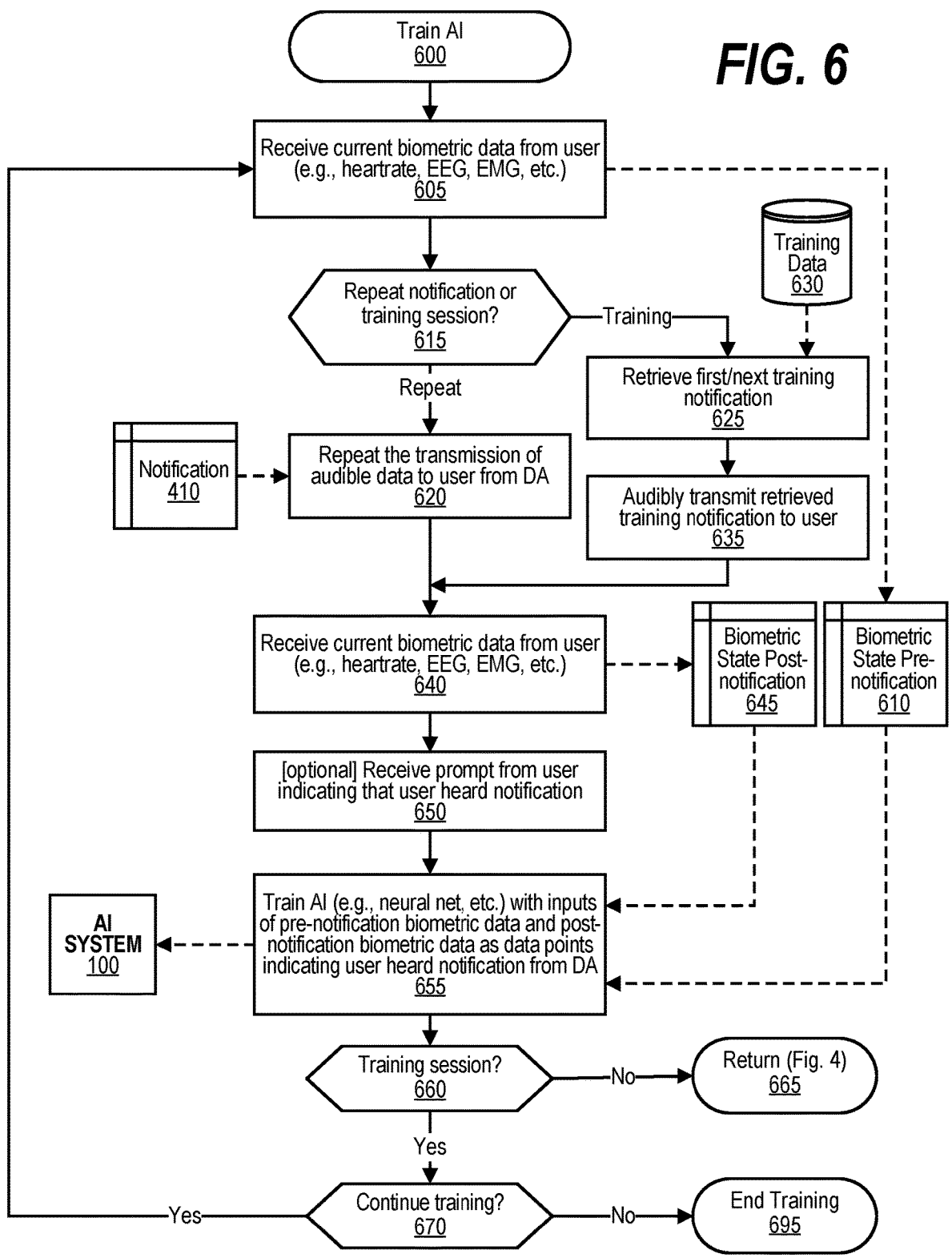
FIG. 6 is a depiction of a flowchart showing the logic used to train the artificial intelligence (AI) to ascertain whether a user heard a notification given pre- and post-notification biometric data sets.

FIG. 6 is a depiction of a flowchart showing the logic used to train the artificial intelligence (AI) to ascertain whether a user heard a notification given pre- and post-notification biometric data sets. FIG. 6 processing commences at 600 and shows the steps taken by a process that trains an artificial intelligence (AI) system to recognize when a user likely heard a notification based on the user's biometric responses. At step 605, the process receives the user's current biometric data readings (e.g., heartrate, EEG, EMG, etc.). This pre-notification biometric data is stored in memory area 610.

The process determines as to whether the notification is being repeated or if the AI system is in an active training session (decision 615). If a notification is being repeated, then decision 615 branches to the 'Repeat' branch, whereupon at step 620, the process repeats the transmission of the audible notification data from memory area 410 to the user from the digital assistant over a speaker. On the other hand, if not repeat notification or training session, then decision 615 branches to the 'no' branch to perform steps 625 and 635 used to train the AI.

Steps 625 and 635 are used to train the AI. At step 625, the process retrieves the first training notification from training data store 630. At step 635, the process audibly transmits the retrieved training notification to user. The training can use multiple sets of audible training notifications received from data store 630 with the routine, as shown at the bottom of the routine, looping back to the beginning of the flowchart (step 605) to repeatedly gather biometric data and retrieve and audibly transmit more sets of training notifications.

At step 640, the process receives the user's current biometric data from user (e.g., heartrate, EEG, EMG, etc.). This post-notification biometric data is stored in memory area 645. At step 650, an optional step may be performed with the system receiving a Boolean (yes/no) prompt from the user indicating whether the user actually heard the notification. At step 655, the process trains AI system 100 (e.g., neural net, etc.) with inputs of pre-notification biometric data and post-notification biometric data as data points indicating user heard the notification transmitted by the digital assistant. In addition, if provided, the AI system can also be trained using the optional prompt where the user indicated (yes/no) whether they actually heard the notification transmitted by the digital assistant.

The process determines whether the routine is being called in a training session or to repeat a notification (decision 660). If the routine is being called in a training session, then decision 660 branches to the 'yes' branch to continue training. On the other hand, if the routine was called to repeat a notification, then decision 660 branches to the 'no' branch and processing returns to the calling routine (see FIG. 4) at 665.

When in a training session, the process determines whether to continue training, such as if there is additional training data in data store 630 yet to be processed (decision 670). If training continues, then decision 670 branches to the 'yes' branch which loops back to step 605 to continue training the AI as described above. This looping continues until no more training is being performed, such as when all the training data in data store 630 has been processed, at which point decision 670 branches to the 'no' branch exiting the loop and processing returns to the calling routine (see FIG. 4) at 695.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method performed by an information handling system that includes a processor and a memory, the method comprising:
   receiving, at a computer system, a baseline biometric data reading pertaining to a user;
   transmitting an audible notification from a speaker proximate to the user;
   after transmitting the audible notification, receiving a first set of biometric data readings pertaining to the user from biometric sensors that are proximate to the user;
   comparing the first set of biometric data readings to a baseline biometric data reading by inputting the first set of biometric data readings into a trained artificial intelligence (AI) system; and
   receiving, from the trained AI system, a confidence level that the user received the audible notification;
   in response to the confidence level being below a threshold:
      retransmitting the audible notification;
      after transmitting the audible notification, receiving a second set of biometric data readings;
      receiving an audible response from the user at a microphone indicating whether the user heard the retransmitted audible notification; and
      training the AI system using the baseline biometric data reading, the second set of biometric data readings, and a Boolean representation that corresponds to the audible response from the user; and
   in response to the confidence level meeting the threshold, inhibiting retransmission of the audible notification.

2. The method of claim 1 wherein the AI system is selected from the group consisting of a neural network, a Question/Answer (QA) system, a statistical classification system, and an automated reasoning system.

3. The method of claim 1, further comprising:
after receiving the first set of biometric data readings pertaining to the user, audibly prompting the user as to whether the user heard the audible notification;
receiving an audible confirmation from the user at the microphone; and
training the AI system using the first set of biometric data readings along with a Boolean representation that corresponds to the audible confirmation from the user.

4. The method of claim 3 wherein the reception of the audible confirmation and the training are performed during a training phase, and wherein the method further comprises:
after the training phase, inhibiting the audible prompting in response to the confidence level indicating that the user heard the audible notification.

5. The method of claim 1 wherein the first set of biometric data readings are selected from of one or more of the group consisting of:
one or more heart rate readings,
one or more eye movement readings,
one or more facial expression readings,
one or more body movement readings,
one or more electroencephalogram readings,
one or more electromyography readings,
one or more nerve response readings, and
one or more brainwave readings.

6. An information handling system comprising:
one or more processors;
a memory coupled to at least one of the processors;
a speaker accessible by at least one of the processors; and
a set of computer program instructions stored in the memory and executed by at least one of the processors in order to perform actions of:
receiving a baseline biometric data reading pertaining to a user;
transmitting an audible notification from the speaker proximate to the user;
after transmitting the audible notification, receiving a first set of biometric data readings pertaining to the user from biometric sensors that are proximate to the user;
comparing the first set of biometric data readings to the baseline biometric data reading by inputting the first set of biometric data readings into a trained artificial intelligence (AI) system; and
receiving, from the trained AI system, a confidence level that the user received the audible notification;
in response to the confidence level being below a threshold:
retransmitting the audible notification;
after transmitting the audible notification, receiving a second set of biometric data readings;
receiving an audible response from the user at a microphone indicating whether the user heard the retransmitted audible notification; and
training the AI system using the baseline biometric data reading, the second set of biometric data readings, and a Boolean representation that corresponds to the audible response from the user; and
in response to the confidence level meeting the threshold, inhibiting retransmission of the audible notification.

7. The information handling system of claim 6 wherein the AI system is selected from the group consisting of a neural network, a Question/Answer (QA) system, a statistical classification system, and an automated reasoning system.

8. The information handling system of claim 6 wherein the actions further comprise:
after receiving the first set of biometric data readings pertaining to the user, audibly prompting the user as to whether the user heard the audible notification;
receiving an audible confirmation from the user at the microphone; and
training the AI system using the first set of biometric data readings along with a Boolean representation that corresponds to the audible confirmation from the user.

9. The information handling system of claim 8 wherein the reception of the audible confirmation and the training are performed during a training phase, and wherein the actions further comprise:
after the training phase, inhibiting the audible prompting in response to the confidence level indicating that the user heard the audible notification.

10. The information handling system of claim 6 wherein the first set of biometric data readings are selected from of one or more of the group consisting of:
one or more heart rate readings,
one or more eye movement readings,
one or more facial expression readings,
one or more body movement readings,
one or more electroencephalogram readings,
one or more electromyography readings,
one or more nerve response readings, and
one or more brainwave readings.

11. A computer program product stored in a computer readable storage medium, comprising computer program code that, when executed by an information handling system (a local node), performs actions comprising:
receiving a baseline biometric data reading pertaining to a user;
transmitting an audible notification from a speaker proximate to the user;
after transmitting the audible notification, receiving a first set of biometric data readings pertaining to the user from biometric sensors that are proximate to the user;
comparing the first set of biometric data readings to the baseline biometric data reading by inputting the first set of biometric data readings into a trained artificial intelligence (AI) system; and
receiving, from the trained AI system, a confidence level that the user received the audible notification;
in response to the confidence level being below a threshold:
retransmitting the audible notification;
after transmitting the audible notification, receiving a second set of biometric data readings;
receiving an audible response from the user at a microphone indicating whether the user heard the retransmitted audible notification; and
training the AI system using the baseline biometric data reading, the second set of biometric data readings, and a Boolean representation that corresponds to the audible response from the user; and in response to the confidence level meeting the threshold, inhibiting retransmission of the audible notification.

12. The computer program product of claim 11 wherein the AI system is selected from the group consisting of a neural network, a Question/Answer (QA) system, a statistical classification system, and an automated reasoning system.

13. The computer program product of claim 11 wherein the actions further comprise:
   after receiving the first set of biometric data readings pertaining to the user, audibly prompting the user as to whether the user heard the audible notification;
   receiving an audible confirmation from the user at the microphone; and
   training the AI system using the first set of biometric data readings along with a Boolean representation that corresponds to the audible confirmation from the user.

14. The computer program product of claim 13 wherein the reception of the audible confirmation and the training are performed during a training phase, and wherein the actions further comprise:
   after the training phase, inhibiting the audible prompting in response to the confidence level indicating that the user heard the audible notification.

* * * * *